United States Patent
Son et al.

(10) Patent No.: US 9,613,286 B2
(45) Date of Patent: Apr. 4, 2017

(54) METHOD FOR CORRECTING USER'S GAZE DIRECTION IN IMAGE, MACHINE-READABLE STORAGE MEDIUM AND COMMUNICATION TERMINAL

(71) Applicants: Samsung Electronics Co., Ltd., Gyeonggi-do (KR); Postech Academy-Industry, Gyeongsangbuk-do (KR)

(72) Inventors: Byung-Jun Son, Seoul (KR); Dai-Jin Kim, Gyeongsangbuk-do (KR); Jong-Ju Shin, Gyeongsangbuk-do (KR); In-Ho Choi, Gyeongsangbuk-do (KR); Tae-Hwa Hong, Seoul (KR)

(73) Assignees: Samsung Electronics Co., Ltd (KR); Postech Academy-Industry Foundation (KR)

( * ) Notice: Subject to any disclaimer, the term of this patent is extended or adjusted under 35 U.S.C. 154(b) by 0 days.

(21) Appl. No.: 14/813,971

(22) Filed: Jul. 30, 2015

(65) Prior Publication Data

US 2015/0339512 A1     Nov. 26, 2015

Related U.S. Application Data

(63) Continuation of application No. 13/757,256, filed on Feb. 1, 2013, now Pat. No. 9,111,171.

(30) Foreign Application Priority Data

Jul. 13, 2012   (KR) .................. 10-2012-0076452

(51) Int. Cl.
*G06K 9/00*     (2006.01)
*G06K 9/46*     (2006.01)
(Continued)

(52) U.S. Cl.
CPC ............. *G06K 9/46* (2013.01); *G06F 1/1686* (2013.01); *G06F 3/013* (2013.01); *G06K 9/0061* (2013.01);
(Continued)

(58) Field of Classification Search
CPC . G06F 3/103; H04N 7/15; H04N 7/14; H04N 7/141; H04N 7/142; H04N 7/147;
(Continued)

(56) References Cited

U.S. PATENT DOCUMENTS 5,675,376 A * 10/1997 Andersson ............. H04N 7/142
                                                              348/14.08
7,206,022 B2    4/2007 Miller et al.
(Continued)

FOREIGN PATENT DOCUMENTS

KR      1020110088361         8/2011

OTHER PUBLICATIONS

Correction of a Gaze in a Front Face Image for Natural Video Call, published Feb. 15, 2012, (pp. 4).

*Primary Examiner* — Wesley Tucker
(74) *Attorney, Agent, or Firm* — The Farrell Law Firm, P.C.

(57) ABSTRACT

A method and mobile terminal for correcting a gaze of a user in an image are provided. The method includes detecting first eye outer points that define a first eye region of the user in an original image; setting second eye outer points different from the first eye outer points; and transforming the first eye region inside of the first eye outer points to a second eye region inside of the second eye outer points.

18 Claims, 13 Drawing Sheets

(51) Int. Cl.
| | |
|---|---|
| *G06K 9/60* | (2006.01) |
| *H04N 5/235* | (2006.01) |
| *G06F 3/01* | (2006.01) |
| *G06T 7/00* | (2017.01) |
| *G06F 1/16* | (2006.01) |
| *G06T 15/04* | (2011.01) |
| *G06T 19/00* | (2011.01) |
| *G06T 11/60* | (2006.01) |

(52) U.S. Cl.
CPC ........... *G06K 9/4652* (2013.01); *G06K 9/605* (2013.01); *G06T 7/0081* (2013.01); *G06T 7/0089* (2013.01); *G06T 11/60* (2013.01); *G06T 15/04* (2013.01); *G06T 19/00* (2013.01); *H04N 5/2351* (2013.01); *G06T 2207/20124* (2013.01); *G06T 2207/30041* (2013.01); *G06T 2210/44* (2013.01)

(58) Field of Classification Search
CPC ............... H04N 7/148; H04N 13/0484; G06K 9/00597; G06K 9/00268; G06K 9/00281

USPC ................................. 382/117, 128, 154, 201
See application file for complete search history.

(56) References Cited

U.S. PATENT DOCUMENTS

| | | | | |
|---|---|---|---|---|
| 8,154,583 | B2* | 4/2012 | Kurtz | ..................... H04N 7/147 348/14.01 |
| 8,180,112 | B2* | 5/2012 | Kurtz | ................. G06K 9/00288 382/103 |
| 8,237,771 | B2 | 8/2012 | Kurtz et al. | |
| 8,274,544 | B2 | 9/2012 | Kurtz et al. | |
| 8,525,788 | B2 | 9/2013 | Chiang | |
| 8,614,676 | B2 | 12/2013 | Chiang | |
| 2004/0005083 | A1* | 1/2004 | Fujimura | ............... A61B 3/113 382/103 |
| 2010/0156781 | A1 | 6/2010 | Fahn | |
| 2013/0070046 | A1* | 3/2013 | Wolf | ..................... H04N 7/144 348/14.16 |
| 2013/0222644 | A1 | 8/2013 | Son et al. | |
| 2014/0368602 | A1 | 12/2014 | Woodgate et al. | |

* cited by examiner

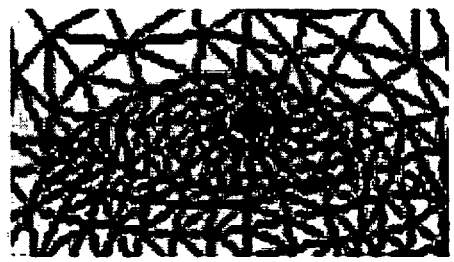 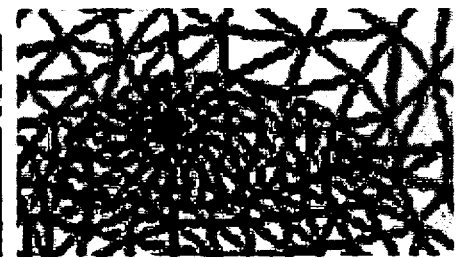
FIG.20A  FIG.20B
 
FIG.21A  FIG.21B

METHOD FOR CORRECTING USER'S GAZE DIRECTION IN IMAGE, MACHINE-READABLE STORAGE MEDIUM AND COMMUNICATION TERMINAL

PRIORITY

This application is a continuation application of U.S. patent application Ser. No. 13/757,256 filed Feb. 1, 2013, which claims priority under 35 U.S.C. §119(a) to Korean Application Serial No. 10-2012-0076452, which was filed in the Korean Intellectual Property Office on Jul. 13, 2012, the entire content of each of which is incorporated herein by reference.

BACKGROUND OF THE INVENTION

1. Field of the Invention

The present invention relates generally to a method of correcting an image, and more particularly, to a method of correcting a difference between a gaze facing straight on to a camera and a gaze at a display unit.

2. Description of the Related Art

In a video call and a video conference using a camera, a gaze of a user who gazes at a display unit for communication may vary based on a difference between a gaze at directed a camera and a gaze directed at the display unit. When the camera is located on the top-left side of the display unit, the user's gaze, as displayed on the display unit, may appear as if the user is gazing at the bottom-right side of the display unit. Similarly, when the camera is located on the top-right side of the display unit, the user's gaze, as displayed on the display unit, may appear as if the user is gazing at the bottom-left side of the display unit. Also, when the camera is located on the top of the center of the display unit, the user's gaze displayed on the display unit may appear as if the user is gazing at the bottom of the center of the display unit.

One conventional gaze correction method includes comparing and analyzing a difference between two images input through two cameras installed on the top/bottom or the right/left sides of a display unit, and generating an image in which a user gazes at the front side (camera) during a video conference.

This conventional method fixes locations of two cameras, and modifies a pose of an overall face by calculating a distance between a user and a camera and a gaze difference associated with the camera and a display unit, so as to overcome the gaze difference.

In order modify the head pose, a technology for separating a face outline region and a background is required. Such technology for automatically separating the face outline region and the background requires a long amount of time, and the performance is unsophisticated. The requirement for two cameras is also a drawback in the conventional method. When performing mobile communication through a mobile terminal, a distance between a camera and the user and a background are frequently changed and thus, it is more difficult to use the conventional method for a real-time video call, a mirror function, a self-photographing function, etc.

SUMMARY OF THE INVENTION

Accordingly, an aspect of the present invention is to solve at least the above-described problems occurring in the prior art, and to provide at least the advantages described below.

Another aspect of the present invention provides a method that extracts only an outline of an eye from a two-dimensional (2D) facial image so as to limit a region of an image that is to be detected, uses an uncomplicated computation such as an Active Shape Model (ASM) so as to effectively reduce an amount of computation and a process time required for eye outline fitting and thus, gaze correction may be effectively performed in a mobile device and a low-spec device.

Another aspect of the present invention provides a method of transforming an eye shape using a 2D eye model and a method of inserting a 2D virtual eye so that a gaze-corrected eye region is displayed to be natural with a background image, and to provide a method of generating a three-dimensional (3D) virtual eye using a 3D eye model.

In accordance with an aspect of the present invention, a method of correcting a gaze of a user in an image is provided. The method includes detecting first eye outer points that define a first eye region of the user in an original image; setting second eye outer points different from the first eye outer points; and transforming the first eye region inside of the first eye outer points to a second eye region inside of the second eye outer points.

In accordance with another aspect of the present invention, a non-transitory machine-readable storage medium in which a program for executing a method of correcting a gaze of a user in an image is recorded is provided. The method includes detecting first eye outer points that define a first eye region of the user in an original image; setting second eye outer points different from the first eye outer points; and transforming the first eye region inside of the first eye outer points to a second eye region inside of the second eye outer points.

In accordance with another aspect of the present invention, a mobile terminal for correcting a gaze of a user in an image is provided. The mobile terminal includes a camera for capturing an original image; a processor for detecting first eye outer points that define a first eye region of the user in the original image, setting second eye outer points different from the first eye outer points, and transforming the first eye region inside of the first eye outer points to a second eye region inside of the second eye outer points; and a display unit for displaying a transformed image including the second eye region.

BRIEF DESCRIPTION OF THE DRAWINGS

The above and other aspects, features, and advantages of the present invention will be more apparent from the following detailed description taken in conjunction with the accompanying drawings, in which:

FIGS. 20A, 20B, 21A, 21B, and 22 are diagrams illustrating a method of performing texture-warping using a three-dimensional (3D) virtual eye according to an embodiment of the present invention.

DETAILED DESCRIPTION OF EMBODIMENTS OF THE PRESENT INVENTION

Various embodiments of the present invention are illustrated in the accompanying drawings and described below in detail. However, the following description does limit the present invention to these specific embodiments, and various changes and substitutions may be performed within the technical scope of the present invention.

In addition, terms, such as first, second, or the like, may be used herein when describing various components of the present invention. Each of these terminologies is not necessarily used to define a corresponding component but may be used merely to distinguish the corresponding component from other component(s). For example, a first component element may be referred to as a second component element, and similarly, the second component element may be referred to as the first component element without departing the scope and sprit of the invention.

As used herein, terms are used merely for describing specific embodiments are not intended to limit the present invention. The singular terms cover plural components unless the singular terms have apparently different meaning contextually.

Unless defined otherwise, all the terms including technical or scientific terms used herein have the same meaning as those understood generally by a person having an ordinary skill in the art. The terms having the same meaning as those defined in generally used dictionaries shall be construed to have the meaning conforming to the contextual meaning of the related technologies, and shall not be construed as ideal or excessively formal meaning unless the terms are apparently defined in this application.

Figure 1:
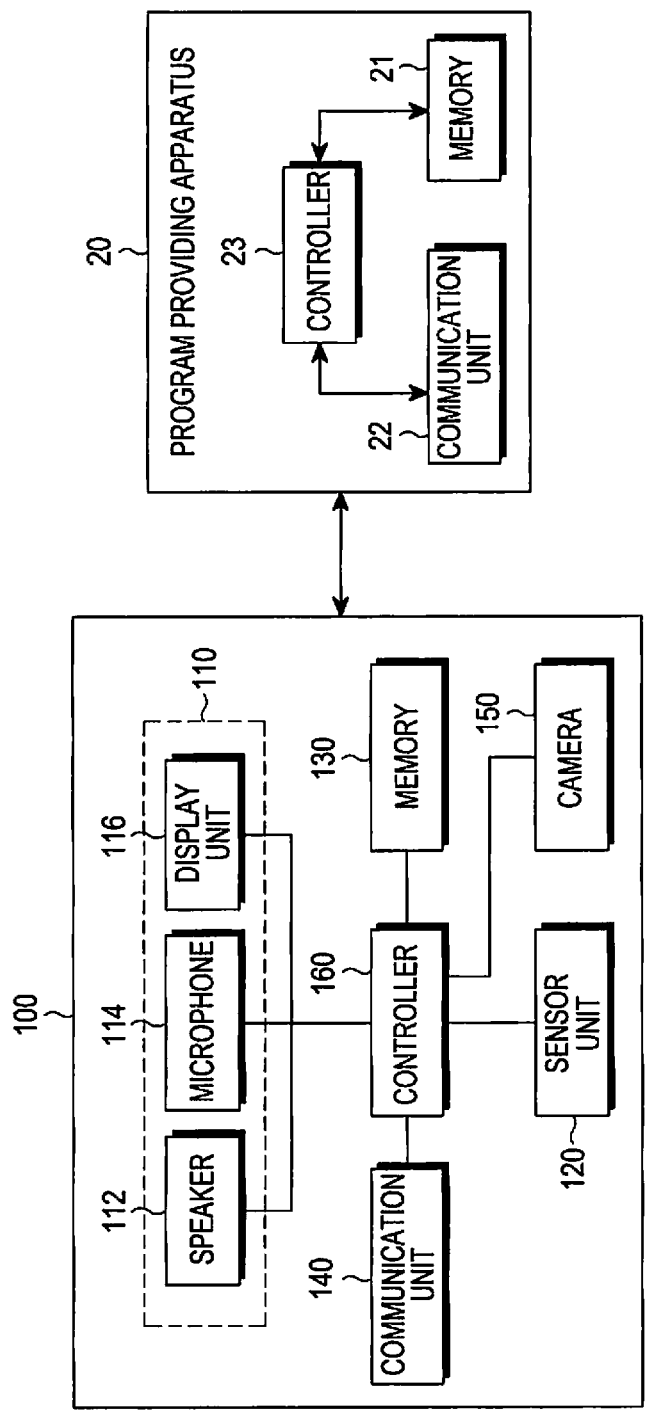
FIG. 1 is a diagram illustrating a configuration of a mobile terminal according to an embodiment of the present invention.

FIG. 1 is a diagram illustrating a configuration of a mobile terminal according to an embodiment of the present invention.

Referring to FIG. 1, a mobile terminal 100 includes a smart phone, a portable phone, a game device, a TV, a display device, a head unit for a car, a notebook, a laptop, a Tablet, a PC, a Personal Media Player (PMP), a Personal Digital Assistants (PDA), etc. The mobile terminal 100 may be embodied as a portable mobile terminal having a wireless communication function.

The mobile terminal 100 includes a user interface 110 including a speaker 111, a microphone 114, and a display unit 116, a sensor unit 120, a memory 130, a communication unit 140, a camera 150, and a controller 160.

The user interface 110 is a device for receiving a user input or for informing a user of information, and may further include a plurality of buttons, a vibration motor, a connector, a key pad, etc. (not shown). A mouse, a trackball, a joystick, a cursor control such as cursor direction keys and the like may be provided for information communication with the controller 160 and for controlling movement of a cursor on the display unit 116, but other examples of the user interface 110 may be used in accordance with embodiments of the present invention.

The speaker 112 may output, to an outside of the mobile terminal 100, a sound corresponding to various signals (for example, a wireless signal, a broadcasting signal, signals related to a digital audio file, a digital moving picture file, photographing, etc.) under the control of the controller 160. The speaker 112 may output a sound corresponding to a function performed by the mobile terminal 100. The speaker 112 may be embodied as a single speaker or a plurality of speakers formed on an appropriate location or appropriate locations of the mobile terminal 100.

The microphone 114 receives a voice or a sound and generates a corresponding electric signal under the control of the controller 160.

A button may be formed on a front side, a lateral side, or a back side of the mobile terminal 100, and may include a power/lock button (not illustrated), a volume button (not illustrated), a menu button, a home button, a back button, and a search button, etc.

The vibration motor converts an electric signal into a mechanical vibration under the control of the controller 160. For example, when the mobile terminal 100 is in a vibration mode and receives a voice or video call from another device (not illustrated), the vibration motor operates. A single vibration motor or a plurality of vibration motors may be formed in the mobile terminal 100. The vibration motor may operate in response to a touch motion of a user who touches a touch screen or in response to successive motions of a touch on the touch screen.

The connector may be used as an interface for connecting the mobile terminal 100 and a server (not illustrated), an external device (not illustrated), or a power source (not illustrated). Under the control of the controller 160, data stored in the memory 130 of the mobile terminal 100 may be transmitted to an external device, or data may be received from an external device, through a wired cable connected to the connector. Through the wired cable connected to the connector, power may be input from a power source and/or a battery may be charged.

The keypad receives key input from a user controlling the mobile terminal 100. The keypad includes a physical keypad formed on the mobile terminal 100 and/or a virtual keypad displayed on the display unit 116.

The display unit 116 displays, on a screen, an image input from the controller 160. A screen such as a Liquid Crystal Display (LCD), a touch screen, etc. may be used as the display unit 116. The touch screen displays an image under the control of the controller 160, generates a key contact interruption when a user input device such as a finger, a stylus pen, and the like is in contact with a surface of the touch screen, and outputs user input information including an input coordinate and an input status to the controller 160 under the control of the controller 160.

The display unit 116 provides the user with user interfaces corresponding to various services (for example, communication, data transmission, broadcasting, and image/moving picture capturing). The display unit 116 outputs, to the controller 160, user input information corresponding to at least one touch input to a graphic user interface. The display unit 116 receives an input of at least one touch through a body part of the user (for example, a finger including a thumb) or a touch device (for example, a stylus pen). Also, the display unit 116 receives input of successive motions of a touch from among the at least one touch. The display unit 116 transmits, to the controller 160, user input information corresponding to the successive motions of the input touch.

According to some embodiments of the present invention, the touch is not be limited to a contact between the display unit 116 and a body part of the user or a touch device, but may also include a non-contact input (for example, where a detectable distance between the display unit 116 and the body part of the user or the touch device is less than or equal to 1 mm). The display unit 116 may be embodied, for example, based on a resistive scheme, a capacitive scheme, an infrared scheme, or an acoustic wave scheme.

The sensor unit 120 includes at least one sensor that detects a status (a location, a direction, a motion, etc.) of the mobile terminal 100. For example, the sensor unit 120 may include a proximity sensor to detect a proximity of the user to the mobile terminal 100, a motion/direction sensor to detect a motion of the mobile terminal 100 (for example, rotation, acceleration, deceleration, vibration, etc. of the mobile terminal 100), etc.

The motion/direction sensor may include an acceleration sensor, a gravity sensor, a geomagnetic sensor, a gyro sensor, an impact sensor, a Global Positioning System (GPS) sensor, a compass sensor, an acceleration sensor, etc. The sensor unit 120 detects a status of the mobile terminal 100, generates a signal corresponding to the detected status, and transmits the generated signal to the controller 160. For example, the GPS sensor receives an electric wave from a plurality of GPS satellites (not illustrated) in the earth's orbit, and calculates a GPS location of the mobile terminal 100 based on a Time of Arrival (TOA) from a GPS satellite (not illustrated) to the mobile terminal 100. The compass sensor calculates a position or a direction of the mobile terminal 100.

The communication unit 140 provides direct connection with a server or an external device, or a connection through a network, and may correspond to a wired or wireless communication unit. The communication unit 140 may wiredly or wirelessly transmit data obtained from the controller 160, the memory 130, the camera 150, etc., or may widely or wirelessly receive data from an external communication line or the air and may transfer the received data to the controller 160 or may store the receive data in the memory 130.

The communication unit 140 includes at least one of a mobile communication module, a wireless Local Area Network (LAN) module, and a Near Field Communications (NFC) module. Examples of the communication unit 140 include an Integrated Services Digital Network (ISDN) card, a modem, a LAN card, an infrared light port, a Bluetooth port, a Zigbee port, and a wireless port, but embodiments of the present invention are not limited thereto.

The mobile communication module enables the mobile terminal 100 to be connected to an external device through mobile communication using at least one antenna (not illustrated) under the control of the controller 160. The mobile communication module transmits/receives a wireless signal for performing a voice call, a video call, exchanging of data, such as a Short Message Service (SMS), a Multimedia Messaging Service (MMS), and the like, or unidirectional transmission or reception, with a phone (not illustrated), a smart phone (not illustrated), a tablet Personal Computer (PC) (not illustrated), or another device (not illustrated), which has a phone number or network address input to the mobile terminal 100.

The wireless LAN module may be connected to the Internet at a place where a wireless Access Point (AP) (not illustrated) is installed, under the control of the controller 160. The wireless LAN module supports the wireless LAN standards of the Institute of Electrical and Electronic Engineers (IEEE), such as IEEE 802.11x. The NFC module may wirelessly perform NFC between the mobile terminal 100 and an image forming device (not illustrated) under the control of the controller 170. NFC schemes used by the NFC module may include Bluetooth, Infrared Data Association (IrDA), etc.

The camera 150 may include a lens system, an image sensor, a flash, etc. The camera converts a light signal input (or captured) through the lens system into an image signal, and outputs the image signal to the controller 160. The user may capture a moving picture or a still image through the camera 150.

The lens system forms an image of a subject by performing convergence of light incident from the outside. The lens system includes at least one lens, and each lens may correspond to a convex lens, an aspheric lens, etc. The lens system is symmetric with respect to an optical axis that passes through the center of the lens system, and the optical axis is defined to be a central axis. The image sensor detects an optical image formed of an external light incident through the lens system as an electric image signal. The image sensor includes a plurality of pixel units arranged in an M×N matrix structure, and the pixel unit includes a photodiode and a plurality of transistors. The pixel unit accumulates an electric charge generated by an incident light, and a voltage associated with the accumulated electric charge indicates an illuminance of the incident light. When an image forming a still image or a moving picture is processed, an image signal output from the image sensor is formed of a set of voltages (that is, pixel values) output from the pixel units, and the image signal indicates a single frame (that is, a still image). Also, the frame is formed of M×N pixels. A Charge-Coupled Device (CCD) image sensor, a Complementary Metal-Oxide Semiconductor (CMOS) image sensor, etc. may be used as the image sensor.

A driving unit drives the image sensor under the control of the controller 160. The driving unit exposes, under the control of the controller 160, all pixels of the image sensor or only pixels in a region of interest from among all the pixels of the image sensor, and image data output from the pixels may be output to the controller 160.

The controller 160 processes an image input from the camera 150 or an image stored in the memory 130 based on a frame unit, and outputs an image frame converted to be suitable for a screen characteristic (a size, a picture quality, a resolution, and the like) of the display unit 116.

The memory 130 stores applications having various functions, such as functions for navigation, a video call, a game, etc, images to provide related Graphical User Interfaces (GUIs), user information, documents, databases associated with a gaze correcting method, background images required for driving the mobile terminal 100 (a menu screen, an idle screen, etc), operating programs, images captured by a camera, etc. The memory 130 is a machine (for example, a computer-readable medium, and the term, machine-readable medium, as used herein, may refer a medium that provides data to the machine so that the machine may perform a predetermined function. The machine-readable medium may be a storage medium. The memory 130 may include a non-volatile medium and a volatile medium. All these media may correspond to a type of media in which instructions transferred through the media are detected by a physical device that reads the instructions into a machine.

The machine-readable medium may include a floppy disk, a flexible disk, a hard disk, a magnetic tape, a Compact Disc Read-Only Memory (CD-ROM), an optical disc, a punch-card, a papertape, RAM, Programmable Read-Only Memory (PROM), an Erasable PROM (EPROM), and a flash-EPROM, but embodiments of the present invention are not limited thereto.

The controller 160 executes an application based on user input information, and the application performs a program operation based on the user input information. In this example, the user input includes an input through a key pad, a touch screen, etc., or a camera-based input. The controller 160 includes a bus for information communication and a processor connected to the bus for processing information. The controller 160 may include a Random Access Memory (RAM) connected to the bus to store information required by the processor. The RAM may be used for storing temporary information required by the processor. The mobile terminal 100 may further include a Read Only Memory (ROM) connected to the bus for storing static information required by the processor. The controller 160, as a central processing unit, controls a general operation of the mobile terminal 100, and performs a gaze correction method according to embodiments of the present invention. The controller 160 performs a video call with a partner mobile terminal using the communication unit 140, the user interface 110, and the camera 150, and performs a gaze correction processing with respect to an original user image input from the camera 150, and transmits, to the partner mobile terminal through the communication unit 140, a gaze-corrected user image and a voice signal of the user received through the microphone 114.

A program processing apparatus 20 includes a program including instructions to instruct the mobile terminal 100 to perform a gaze correction method, a memory 21 for storing program update information and the like, a communication unit 22 for performing wired or wireless communication with the mobile terminal 100, and a controller 23 for transmitting a corresponding program or update information to the mobile terminal 100, automatically or in response to a request of the mobile terminal 100.

Figure 2:
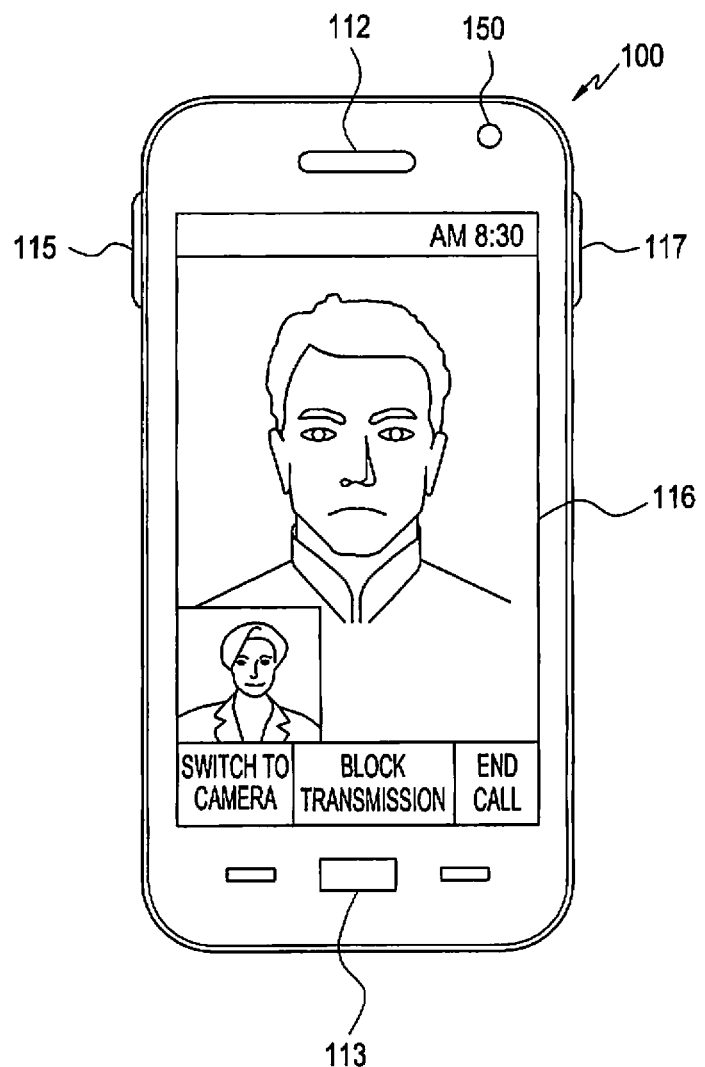
FIG. 2 is a schematic diagram illustrating an external configuration of a mobile terminal that performs a video call function according to an embodiment of the present invention.

FIG. 2 is a schematic diagram illustrating an external configuration of a mobile terminal that performs a video call function according to an embodiment of the present invention.

Referring to FIG. 2, a display unit 116 is disposed on a front side of the mobile terminal 100, the speaker 112 and the camera 150 is disposed on the display unit 116, and a home button 113 is disposed on a lower side of the display unit 116. A volume button 115 is disposed on one of the lateral sides of the mobile terminal 100, and a power button 117 is disposed on the remaining lateral side.

When a first user inputs a video call command through the user interface 110, the controller 160 displays, to the first user, a second user image of a second user received from a partner mobile terminal through the communication unit 140 and also displays a first user image of the first user captured by the camera 150. The controller 160 also outputs, to the first user through the speaker 112, a voice signal received from the partner mobile terminal through the communication unit 140.

The controller 160 receives the first user image of the first user from the camera 150, corrects the first user image so as to correct a gaze of the first user included in the first user image, and transmits the gaze-corrected first user image to the partner mobile terminal through the communication unit 140. The controller 160 also transmits a voice signal of the first user received through the microphone 114 to the partner mobile terminal through the communication unit 140.

Figure 3:
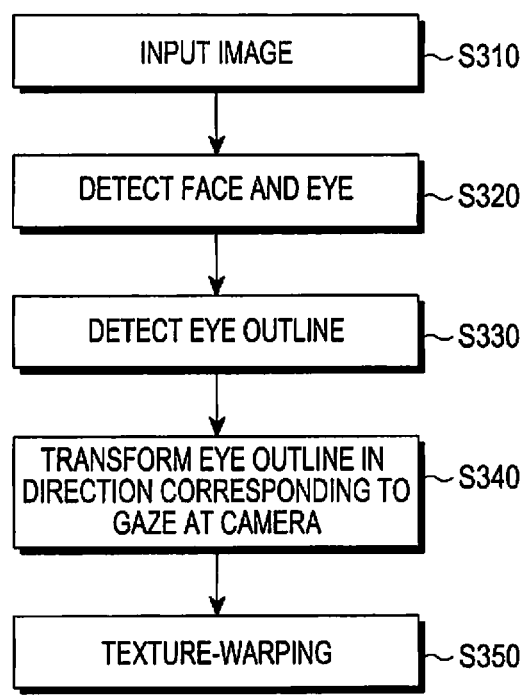
FIG. 3 is a flowchart illustrating a gaze correction method according to an embodiment of the present invention.

FIG. 3 is a flowchart illustrating a gaze correction method according to an embodiment of the present invention.

Referring to FIG. 3, in step S310, the controller 160 receives an input of a user image from the camera 150, or reads a user image stored in the memory 130. Although the method is described with reference a single user image, the method is applicable to each of a plurality of images that are sequentially input or read. The method may also be performed with respect to a user image input in real time from the camera 150 while the mobile terminal 100 performs an one-to-one video call or a multi-point video conference, or may be performed with respect to a user image input in real time through the camera 150 from an application other than a communication application. Hereinafter, when an input user image is required to be distinguished from a gaze-corrected user image, the input user image is referred to as an original user image.

In step S320, the controller 160 detects (or extracts) a facial region and an eye region from the user image. To distinguish an eye and a face of a user or a face and an eye in the user image, the face and the eye in the user image are referred to as a facial region and an eye region, and the facial region and the eye region may also be referred to as a face (or a facial image) and an eye (or an eye image), respectively.

The controller 160 determines whether a face is included in the user image, and extracts a corresponding facial region when the face of the user is included. Here, extraction of the facial region is performed based on a general facial region extraction method, and a facial region extracting technology that performs extraction using an outline of a face, a skin color and/or a skin texture of a face, a template, etc., may be used. For example, the controller 160 may perform face-learning through facial images of a plurality of different users, and extract the facial region from the input user image based on the face-learning.

Figure 4:
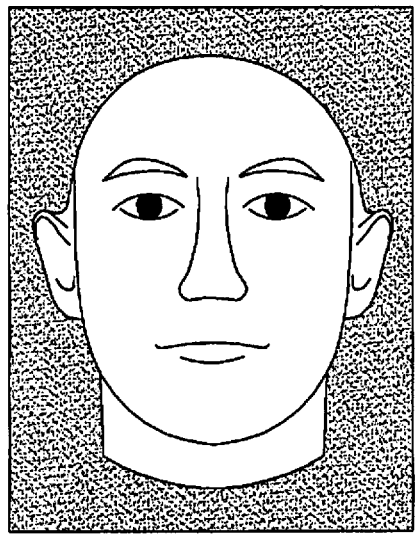
FIG. 4 is a diagram illustrating an example of an extracted facial region according to an embodiment of the present invention.
Figure 5:
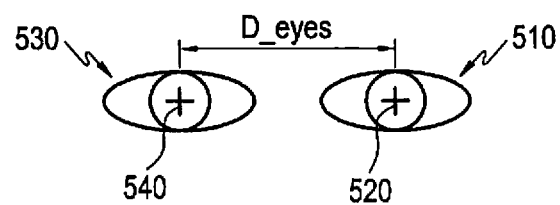
FIG. 5 is a diagram illustrating central points of extracted both eye regions according to an embodiment of the present invention.

FIG. 4 is a diagram illustrating an example of an extracted facial region, and FIG. 5 is a diagram illustrating central points of extracted both eye regions in accordance with embodiments of the present invention. A distance between a central point 520 of a left eye region 510 and a central point 540 of a right eye region 530 is defined to be D_eyes.

Referring to FIGS. 4 and 5, the controller 160 extracts both eye regions 510 and 530 from the extracted facial region. Extraction of the eye region may be performed based on eye-leaning in the same manner as the face-learning. For example, the controller 160 may perform eye-leaning through eye images of a plurality of different users (i.e., eye parts of facial images), and may extract the eye region from an input user image based on the eye-leaning.

The controller 160 detects central points 520 and 540 of the left and right eye regions 510 and 530. The central points 520 and 540 of the eye region may be expressed using x and y coordinates based on a central point of a pupil.

In step S330, the controller 160 extracts an outline of an eye.

To correct a gaze, a location of the eye region is determined, and an exact eye outline of the eye region is detected. The eye outline may be defined by a plurality of eye outer points. A method of selecting the eye outline is to detect a shape of an eye outline that is most similar to the extracted eye region. To detect the eye outline, a fitting method that is based on a shape model, referred to as an Active Shape Model (ASM), may be used. To generate the shape model of an eye, several hundred pieces of eye shape data of different users may be used. The eye shape data is formed of a plurality of eye outer points (8 eye outer points are used in the present embodiment of the present invention) that represent the eye outline. An average shape of the eye model and eigen vectors that represent the eye shape (or eigen shapes of the eye model or unit vectors of the eye model) may be extracted by performing a Primary Component Analysis (PCA) based on the eye outer points of the plurality pieces of eye shape data. Eye model shape parameters (that is, eigen values) of the extracted eye region may be extracted using the extracted eigen vectors, and the eye model shape parameters may be used for detecting the eye outline. Although the embodiments of the present invention use 8 points that represent the eye outline, a number of the points is not limited thereto.

An equation for extracting eigen vectors from n pieces of eye shape data is given below as Equations (1) and (2). Here, n pieces of eye shape data corresponds to hundreds pieces of eye shape data. First, an average vector $\bar{x}$ with respect to all eye shape data is calculated, and a matrix D may be calculated by subtracting the average vector from a vector $x_i$ associated with each eye shape data, as given below.

$$D = ((x_1 - \bar{x}) | \ldots | (x_n - \bar{x})) \quad \text{Equation (1)}$$

In the matrix D, a covariance matrix S and a covariance matrix T associated with a transpose matrix of the matrix D may be calculated as below.

$$S = \frac{1}{n} DD^T, \quad T = \frac{1}{n} D^T D \quad \text{Equation (2)}$$

Three eigen vectors may be selected by performing eigen value decomposition on the matrix T.

FIGS. 6A through 6D illustrate an average shape of an eye model and shapes of three eigen vectors according to an embodiment of the present invention.

Figure 6A:
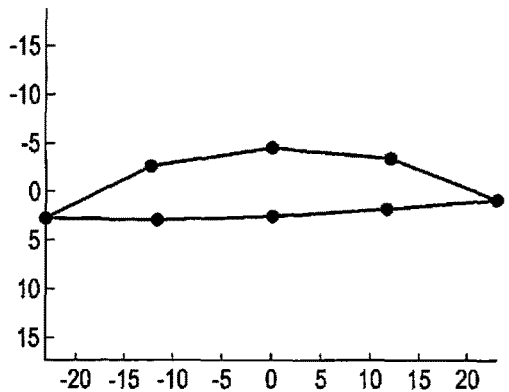
FIGS. 6A through 6D are diagrams illustrating an average shape of an eye model and shapes of three eigen vectors according to an embodiment of the present invention.
Figure 6B:
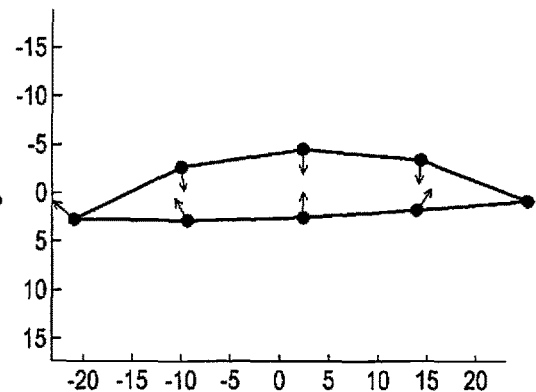
Figure 6C:
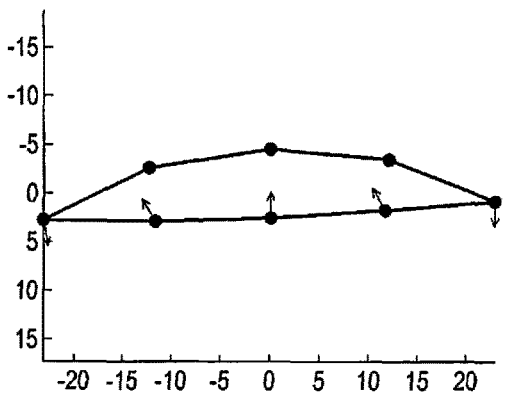
Figure 6D:
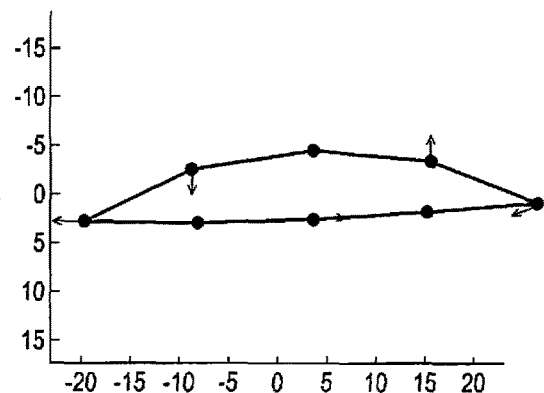

FIG. 6A illustrates an average shape of an eye model, and FIGS. 6B through 6D illustrate three shapes of eigen vectors (that is, eigen shapes). The average shape of the eye model is an initial condition for detecting eye outer points, and the eigen vectors correspond to unit vectors for expressing an eye shape. For example, when the three eigen vectors are defined to be A, B, and C, the shape of the eye may be expressed to be aA+bB+cC. Here, a, b, and c correspond to eye model shape parameters.

Step S330 may include a first sub-step to set a candidate eye outer point and a second sub-step to set a final eye outer point.

In the first sub-step, illuminance correction is applied to minimize an effect from light on an extracted eye region, and the average shape of the eye model is disposed on the illuminance-corrected eye region so that the eye region and the average shape are superposed. For example, the eye region and the average shape are superposed so that a central point of the eye region matches a central point of the average shape and a line connecting the central point of the eye region and an inner end point of the eye region is parallel to a line connecting the central point of the average shape and an inner end point of the average shape. An end point of a right eye region may correspond to a one-fifth point of the distance between a central point of the right eye region and a central point of a left eye region, from the right central point.

Figure 7:
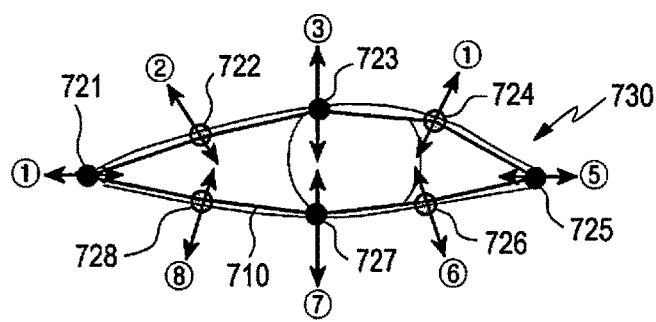
FIG. 7 is a diagram illustrating a step of setting a candidate eye outer point according to an embodiment of the present invention.

FIG. 7 is a diagram illustrating a step of setting a candidate eye outer point according to an embodiment of the present invention.

Referring to FIG. 7, in an initial eye outline 710 showing an average shape, second through eighth initial eye outer points 722 through 728 are set along a trajectory of the initial eye outline 710 clockwise or counterclockwise from a first initial eye outer point 721 located at an outer end of the initial eye outline 710. A normal line direction (or a normal vector direction) with respect to each initial eye outer point is marked by an arrow, and reference numbers ① through ⑧ are assigned to first through eighth normal line directions. Each candidate eye outer point is detected from a corresponding initial eye outer point in a corresponding normal line direction, and a point of which a change in a pixel brightness value is the highest is determined as the corresponding candidate outer point. A normal line direction may be set to a straight line direction that passes a central point of an eye region 730 and an initial eye outer point, or may be set to a normal line direction that passes an initial eye outer point when the initial eye outline 710 formed of straight lines is approximated to a curve.

Selection of a candidate eye outer point may be performed according to Equation (3) below.

$$\operatorname*{argmax}_{i} |I(X_i) - I(X_{i-1})| \quad \text{Equation (3)}$$

In Equation (3), $I(X_i)$ denotes a pixel value (that is, a brightness value) at a pixel (or a block formed of a plurality of pixels) $X_i$ of the eye region 730, and a pixel having the highest brightness difference in a normal vector direction is selected as a candidate eye outer point. In this example, a range of displacement from an initial eye outer point to a candidate eye outer point is different based on a location of the initial eye outer point and thus, limits of a detection range may be determined based on the location of the initial eye outer point as shown in Table 1 below. For example, a mid-portion of the eye region 730 significantly varies vertically and thus, a wide detection range for this portion is set. An end portion of the eye region 730 slightly varies and thus, a narrow direction range for this portion is set.

TABLE 1

| Normal line direction | | | | | | | | |
|---|---|---|---|---|---|---|---|---|
| Upper limit | | | | | | | | |
| Lower limit | 2 | 2 | 3 | 2 | 2 | 2 | 3 | 2 |

Figure 8:
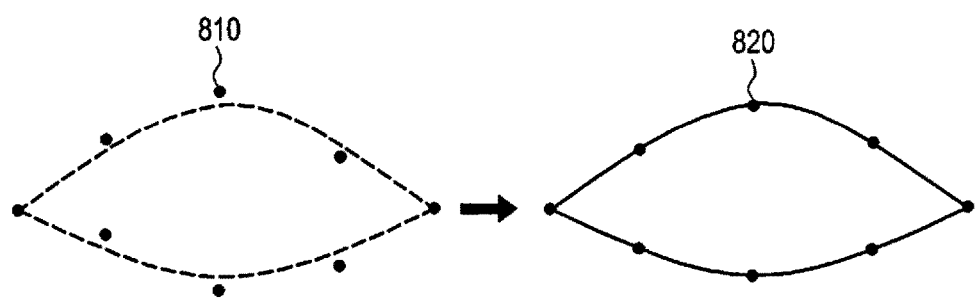
FIG. 8 is a diagram illustrating a second sub-step of setting a final eye outer point according to an embodiment of the present invention.

FIG. 8 is a diagram illustrating a second sub-step of setting a final eye outer point according to an embodiment of the present invention.

FIG. 8 illustrates candidate eye outer points (i.e., outer points of eyes). When the candidate eye outer points 810 are connected, a candidate eye outline significantly deviates from a general eye shape.

Therefore, eye model shape parameters are extracted by projecting the candidate eye outer points 810 on eigen vectors, and a range of each of the extracted eye model shape parameters is limited so that a shape of an eye is not distorted. Accordingly, final eye outer points 820 as shown in FIG. 8 are set.

The eye model shape parameters may be calculated based on Equation (4) below.

$$P = M \cdot Y \quad \text{Equation (4)}$$

In Equation (4), Y denotes candidate eye outer points, M denotes eigen vectors, and P denotes eye model shape parameters.

A plurality of eye images for eye-learning are displayed in a space that uses eigen vectors as axes, and ranges of the eye model shape parameters may be respectively limited based on a dense distribution range of the plurality of eye images. The second sub-step may be omitted or may be used for setting a detection range of the first sub-step.

Figure 9:
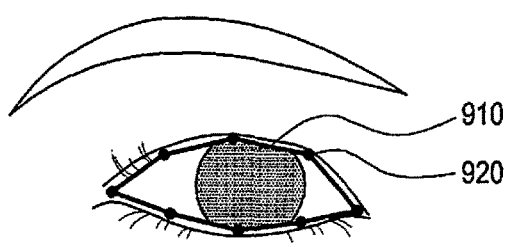
FIG. 9 is a diagram illustrating a detected final eye outline according to an embodiment of the present invention.

FIG. 9 is a diagram illustrating a detected final eye outline according to an embodiment of the present invention.

Referring to FIG. 9, a detected final eye outline 910 may be defined by lines that connect 8 eye outer points 920. Hereinafter, a final eye outline is referred to as a first eye outline, and a final eye outer point is referred to as a first eye outer point.

In step S340, the controller 160 transforms (or modifies) the first eye outline in a camera gaze direction corresponding to a gaze at the camera 150. More specifically, the controller 160 changes eye outer points of an eye region in a user image in a predetermined reference camera gaze direction. The controller 160 transforms eye outer points defining an eye outline, based on a difference between a face gaze direction of a user in a current image (i.e., an angle or a gradient of a face) and the predetermined reference camera gaze direction (i.e., an angle or a gradient of a face).

The controller 160 may detect a face gaze direction (or an angle of a face) and/or a gradient of a face, and may determine whether the detected facial image gazes at a front side, a left side, a right side, an upper side, a lower side, or a diagonal side (a top-left side, a top-right side, a bottom-left side, or a bottom-right side). For example, the controller 160 performs face-leaning through facial images facing at various angles, and may detect the angle of the face or the face gaze direction from the user image based on the face-learning.

Eye-leaning is performed using a plurality of eye image pairs to transform the eye outline, and the eye outline is transformed based on the eye-learning. More specifically, an eye gazing at the display unit 116 of the mobile terminal 100 (i.e., an eye gazing at a lower side) and an eye gazing at the camera 150 of the mobile terminal 100 (i.e., an eye gazing at the front side) are captured with respect to the same person, and the mobile terminal 100 learns the manner in which an eye shape is transformed in the two images.

Figure 10:
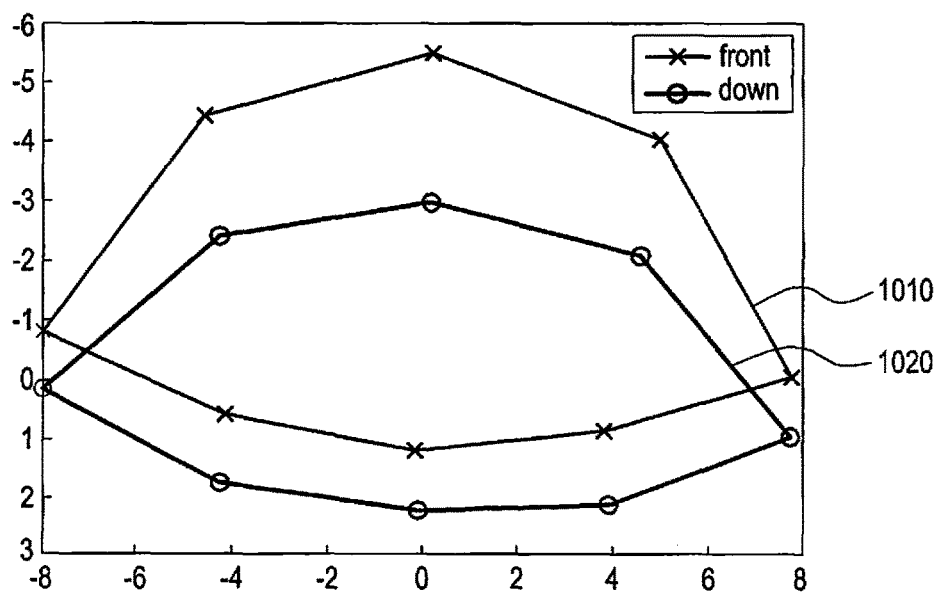
FIG. 10 is a diagram illustrating an average eye outline of an eye that gazes at a lower side and an average eye outline of an eye that gazes at the front side according to an embodiment of the present invention.

FIG. 10 is a diagram illustrating an average eye outline of an eye that gazes at a lower side and an average eye outline of an eye that gazes forward according to an embodiment of the present invention.

The following Equation (5) is used to calculate an average change of each eye outer point between an eye gazing at a lower side and an eye gazing at the front side. $X_i^{j,a}$ denotes an $i^{th}$ eye outer point of a $j^{th}$ eye image that gazes at the front side, and $X_i^{j,b}$ denotes an $i^{th}$ eye outer point of a $j^{th}$ eye image that gazes at a lower side.

$$dX_i = \frac{1}{N} \sum_{j=1}^{N} \left( X_i^{j,a} - X_i^{j,b} \right) \quad \text{Equation (5)}$$

A second eye outer point $X'_i$ may be calculated by adding a displacement $dX_i$ (that is, an average displacement) to a first eye outer point $X_i$, which is expressed by Equation (6) below.

$$X'_i = X_i + dX_i \quad \text{Equation (6)}$$

Figure 11:
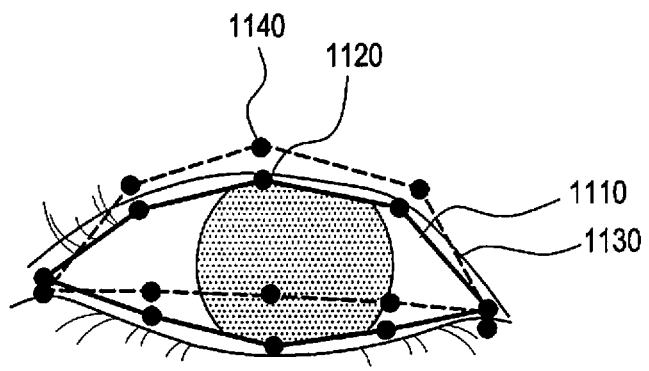
FIG. 11 is a diagram illustrating transformation of an eye outline according to an embodiment of the present invention.

FIG. 11 is a diagram illustrating transformation of an eye outline according to an embodiment of the present invention.

Referring to FIG. 11, a first eye outline 1110 and first eye outer points 1120, and a second eye outline 1130 and second eye outer points 1140 are illustrated.

Referring again to FIG. 3, in step S350, the controller 160 performs texture-warping of a region inside of the first eye outline to a region inside of the second eye outline.

FIGS. 12 through 15 are diagrams illustrating texture-warping according to an embodiment of the present invention.

Figure 12:
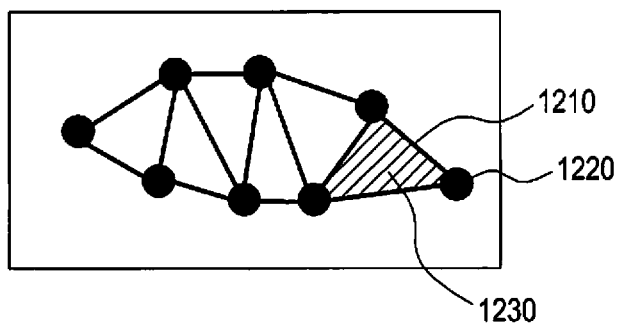
FIGS. 12, 13A, 13B, 14A, 14B, and 15 are diagrams illustrating a texture warping step according to an embodiment of the present invention.

Referring to FIG. 12, a plurality of first triangles 1230 (6 triangles in the present embodiment of the present invention) are formed by connecting a plurality of first eye outer points 1220 (8 eye outer points in the present embodiment) of a first eye outline 1210.

Figures 13A, 13B:
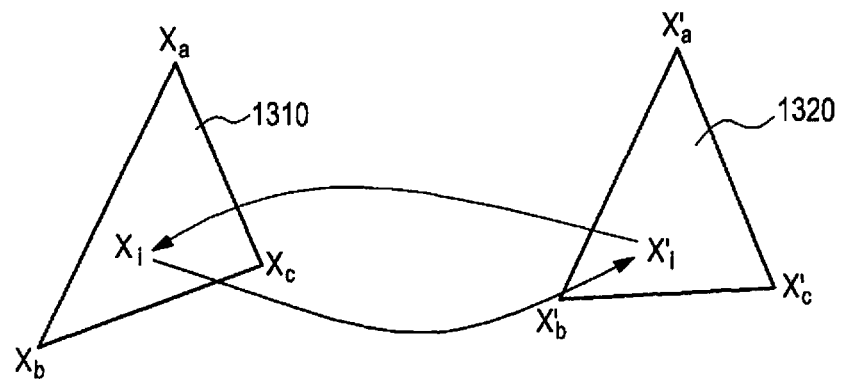

Referring to FIG. 13, mapping (i.e., mapping between pixel values) is performed between pixels inside a first triangle 1310 formed by using first eye outer points $X_a$, $X_b$, and $X_c$ and pixels inside a second triangle 1320 formed by using second outer points $X'_a$, $X'_b$, and $X'_c$. This process is referred to as texture-warping. In this example, both the first triangle 1310 and the second triangle 1320 are located in the same user image. More specifically, the first triangle 1310 is replaced with the second triangle 1320 in the user image.

A matrix as shown below may be formed by using coordinates corresponding to vertexes of each triangle according to the following Equation (7).

$$S = \begin{bmatrix} X_a & X_b & X_c \\ 1 & 1 & 1 \end{bmatrix}, T = \begin{bmatrix} X'_a & X'_b & X'_c \\ 1 & 1 & 1 \end{bmatrix} \quad \text{Equation (7)}$$

In Equation (7), $X_a$, $X_b$, and $X_c$ forming S correspond to x and y coordinates of three points forming the first triangle 1310 from among the first eye outer points, and $X'_a$, $X'_b$, and $X'_c$ forming T correspond to x and y coordinates of three points forming the second triangle 1320 corresponding to the first triangle 1310 after $X_a$, $X_b$, and $X_c$ are shifted through the eye outline transformation.

For example, S and T are expressed according to Equation (8) below.

$$S = \begin{bmatrix} X_a(x) & X_b(x) & X_c(x) \\ X_a(y) & X_b(y) & X_c(y) \\ 1 & 1 & 1 \end{bmatrix}, \quad \text{Equation (8)}$$

$$T = \begin{bmatrix} X'_a(x) & X'_b(x) & X'_c(x) \\ X'_a(y) & X'_b(y) & X'_c(y) \\ 1 & 1 & 1 \end{bmatrix}$$

Values may need to be substituted with respect to all pixels (or points) in the second triangle 1320 and thus, a relationship between the first and the second triangles 1310 and 1320 is required. A relationship between two matrices S and T may be expressed according to Equation (9) below.

$$S = BT \quad \text{Equation (9)}$$

In Equation 9, a matrix B that transforms T into S is referred to as an affine transformation matrix. The affine transformation matrix B may be calculated based on the following Equation (10).

$$B = ST^{-1} \quad \text{Equation (10)}$$

A pixel (or a block formed of a plurality of pixels) $X_i$ inside the first triangle 1310 may be obtained by multiplying a pixel (a block formed of a plurality of pixels) $X'_i$ inside the second triangle 1320 and B obtained from the above equation. More specifically, using the following Equation (11), $X_i$ corresponding to $X'_i$ and a pixel value (for example, a brightness value) of $X'_i$ may be obtained.

$$X_i = B_{2 \times 3} \begin{bmatrix} X'_i \\ 1 \end{bmatrix}, I(X'_i) \Leftarrow I(X_i) \quad \text{Equation (11)}$$

In Equation (11), only a 2×3 submatrix of the affine transformation matrix B is used, since x and y coordinates of $X_i$ is a two dimensional (2D) value. First and second columns of an affine transformation matrix correspond to information associated with a size of a coordinate and information associated with rotation, respectively, and a third column of the affine transformation matrix corresponds to information associated with a shift of a coordinate. Therefore, shift is enabled by adding 1 below $X'_i$. A value of $X_i$ (e.g., a pixel value, an intensity value of a pixel, a color value of a pixel, an average value of pixel values, a representative value of pixel values (such as a maximum value, an intermediate value, etc.), etc.) is read, and the read value is substituted in $X'_i$. More specifically, the value of $X_i$ is substituted in the value of $X'_i$. A gaze-corrected eye region that gazes at the front side may be generated by performing the process on all triangles in the second eye outline.

The texture-warping may be equivalently applied when a first window including a first eye outline is replaced with a second window including a second eye outline in the user image.

Figures 14A, 14B:

FIGS. 14A and 14B are diagrams illustrating a shape of an eye that is transformed by texture-warping according to an embodiment of the present invention. FIG. 14A illustrates a shape of an eye before transformation, and FIG. 14B illustrates a shape of an eye after transformation.

Referring to FIGS. 14A and 14B, when texture-warping is performed on only an inside region of an eye outline, only an eye region is shifted and thus, the texture warping may appear unnatural. Accordingly, it is desirable to perform texture-warping on an ambient area of the eye region.

Figure 15:
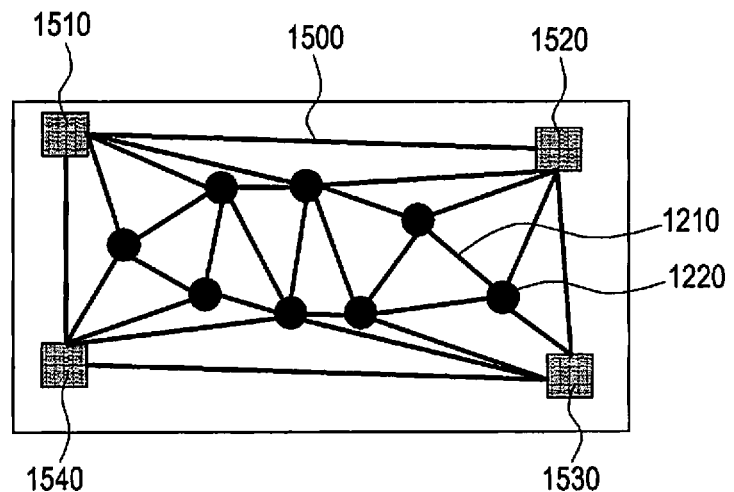

FIG. 15 is a diagram illustrating a window used for texture-warping according to an embodiment of the present invention. Four immovable first window points 1510 through 1540 (that is, window pixels) that define a first window 1500 are set in an ambient region of the first eye outline 1210 so as to include the first eye outer points 1220 of the first eye outline 1210 and second eye outer points (not illustrated) of a second eye outline.

A plurality of first triangles (6 triangles in the present embodiment) is formed by connecting the first eye outer points 1220 and the first window points 1510 through 1540. Although a second window (not illustrated) set in an ambient region of the second eye outline has a different name than the first window 1500 in order to distinguish between the first and second windows, the second window is set to have an identical location and an identical area as the first window 1500. Hereinafter, a region inside the first window 1500 is texture-warped to a region inside the second window, in the same manner as the described texture-warping.

The texture-warping step may be performed using a virtual eye. More specifically, a gaze-corrected user image may be generated by performing the texture-warping step using a virtual eye, as opposed to using an eye region of an original user image. When a user gazes at a left side or a right side in the original user image, the user in the gaze-corrected user image still gazes at the left side or the right side, even after gaze correction is performed. More specifically, although a vertical location of a pupil is shifted through gaze correction, a horizontal location of the pupil is not shifted through the gaze correction. To overcome this drawback, a virtual eye that gazes at the front side may be used. In this example, the virtual eye may be generated to appear similar to an eye of the user.

Hereinafter, texture-warping using a 2D virtual eye, and then texture-warping using a three-dimensional (3D) virtual eye according to embodiments of the present invention are described.

Figure 16:
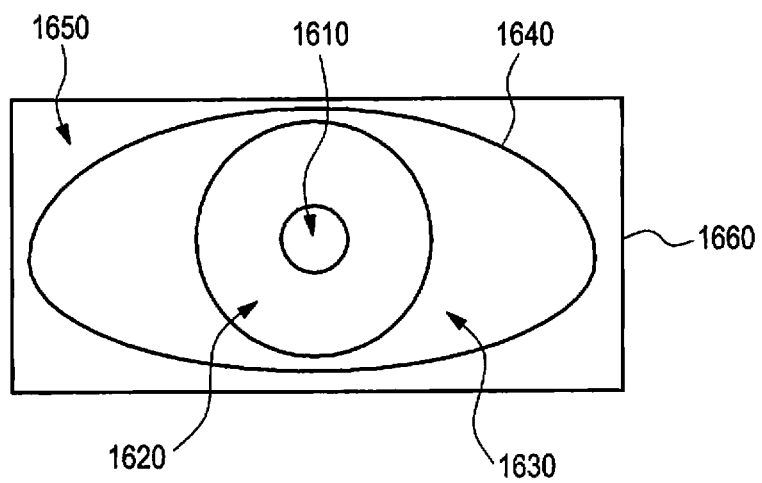
FIG. 16 is a diagram illustrating a virtual eye according to an embodiment of the present invention.

FIG. 16 is a diagram illustrating a virtual eye according to an embodiment of the present invention.

A virtual eye includes an eye region of a first eye outline 1640 including a pupil 1601, an iris 1620, and a sclera 1630, and an ambient region 1650 (or a skin region) outside the first eye outline 1640. Also, standard texture information generated based on eye images of various persons may be used as texture information corresponding to each part of the virtual eye.

The standard texture information may be modeled with respect to a pupil, an iris, a sclera, and an ambient region, using eye images classified based on a race and a color. One the basic example of generating standard texture information for each part is a method of utilizing average information. As an example, when standard texture information of an iris is generated, an average color value of n iris images having similar colors may be utilized as the standard texture information of the iris. In a similar manner, standard texture information may be modeled with respect to a pupil, a sclera, and an ambient region. The standard texture information may be modeled through various statistical methods in addition to the described modeling method based on the average information.

When a second eye outline, second eye outer points, and a second window (not illustrated) are set, a region inside a first window 1660 is texture-warped to a region inside the second window. More specifically, the first window is replaced with the second window in a user image.

The gaze correction may be performed more quickly by using virtual standard texture information that is similar to texture information (for example, an intensity value) of the user image, as opposed to using the texture information.

An affine transformation matrix for matching between pixels inside the first window 1660 and pixels in the second window may be calculated based on Equations (7) through (10). In this example, S is set with respect to the virtual eye, as opposed to the user image.

A pixel value of a pixel $X_i$ inside the first window 1660 corresponding to a pixel $X'_i$ inside the second window and a pixel value of the pixel $X'_i$ may be calculated using the following Equation (12).

In Equation (12), V denotes a pixel value of $X_i$ inside a virtual eye.

$$X_i = B_{2\times 3}\begin{bmatrix} X'_i \\ 1 \end{bmatrix}, I(X'_i) \Leftarrow V(X_i) \qquad \text{Equation (12)}$$

Figure 17:
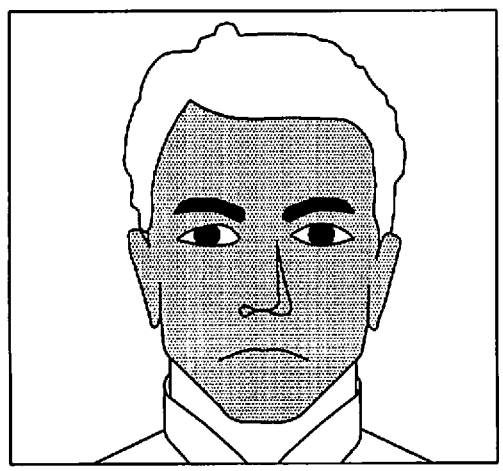
FIG. 17 is a diagram illustrating a gaze-corrected user image to which a virtual eye is inserted according to an embodiment of the present invention.

FIG. 17 is a diagram illustrating a gaze-corrected user image to which a virtual eye is inserted according to an embodiment of the present invention. Although a user gazes at a left side or a right side in an original user image, the user may gaze at the front side in a gaze-corrected user image since a virtual eye is used. However, when an overall brightness between the virtual eye and a real eye is different, an eye may be unnaturally displayed, as illustrated in FIG. 17.

Therefore, Equation (12) is used to calculate a pixel value of $X'_i$, based on a difference in the overall brightness between the virtual eye and the real eye region, as described in further detail as follows.

When a brightness of the virtual eye is adjusted based on a brightness of the real eye region, a degree of the brightness of the virtual eye that is required to be changed is determined by comparing a difference between a brightness of a sclera in the real eye region and a brightness of a sclera in the virtual eye. A brightness of an image may have a value in a range from 0 through 255, where 0 indicates a black color and 255 indicates a white color.

Figure 18:
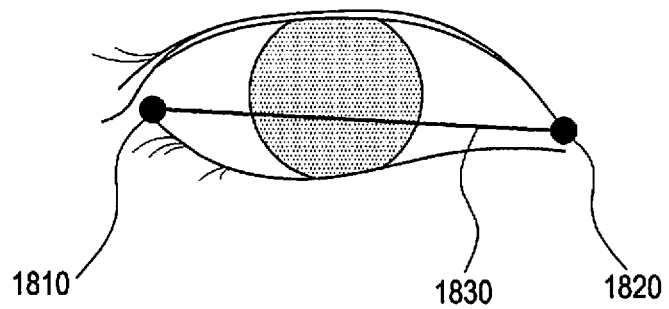
FIG. 18 is a diagram illustrating a method of adjusting a brightness of a virtual eye according to an embodiment of the present invention.

FIG. 18 is a diagram illustrating a method of adjusting a brightness of a virtual eye according to an embodiment of the present invention.

Referring to FIG. 18, in order to effectively detect the brightest pixel of an eye region from an original user image, only the brightness of pixels located on a line 1830 connecting eye outer points $X_{left}$ 1810 and $X_{right}$ 1820 corresponding to a left end point and a right end point of a first eye outline are compared, and a value of the brightest pixel are determined, according to the following Equation (13).

$$b = \underset{I(X_i)}{\operatorname{argmax}}(I(X_i)), X_{left} < X_i < X_{right} \qquad \text{Equation (13)}$$

In Equation (13), $X_i$ denotes a point between $X_{left}$ 1810 and $X_{right}$ 1820 located on the line 1830, and b denotes a largest value from among brightness values of the pixels on the line 1830. When a pixel having the greatest brightness value b is defined to be $X_b$, a pixel having an identical location to $X_b$ is detected from a virtual eye. When a brightness of the pixel detected from the virtual eye is b', a difference between a brightness of the eye region of the original user image and a brightness of the virtual eye may be approximated according to Equation (14) below.

$$\Delta b = b - b' \qquad \text{Equation (14)}$$

The brightness of the virtual eye may be adjusted based on the brightness of the eye region of the user image by changing $I(X'_i)$ in Equation (12), as shown in Equation (15) below.

$$I(X'_i) \Leftarrow V(X_i) + \Delta b \qquad \text{Equation (15)}$$

Figure 19:
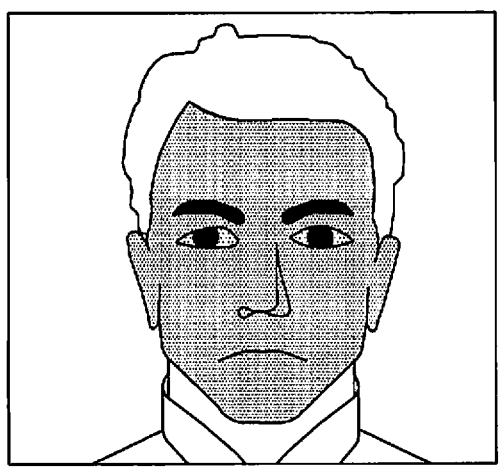
FIG. 19 is a diagram illustrating a gaze-corrected user image to which a virtual eye of which a brightness is adjusted is inserted according to an embodiment of the present invention.

FIG. 19 is a diagram illustrating a gaze-corrected user image to which a virtual eye of which a brightness is adjusted is inserted according to an embodiment of the present invention.

Referring to FIG. 19, when a brightness of a virtual eye is adjusted based on a brightness of an eye region of an original user image, an eye is more naturally displayed than as shown in FIG. 17.

In the described texture-warping method using a virtual eye, gaze correction is performed, and simultaneously, a color of the eye region is changed, by using one of 2D virtual eyes having various colors.

An eye color of a user may be applied to the virtual eye, as opposed to using standard texture information in advance. For example, a pupil, an iris, and a sclera are distinctively recognized by measuring a change in a brightness value along a central line between an upper line and a lower line of first eye outer points, and texture information associated with the pupil, the iris, and the sclera may be mapped to the virtual eye. A line connecting a central coordinate of the eye region and an eye outer point located at a left end or a right end may be used, instead of the central line between the upper line and the lower line of the first eye outer points. Also, when it is difficult to perform separation between the pupil and the iris, texture information of the iris including the pupil may be mapped to an inside of an iris including a pupil of the virtual eye.

Hereinafter, a method of performing texture-warping using a 3D virtual eye according to an embodiment of the present invention is described. In this method, the 3D virtual eye is inserted into an original user image to correct a user to gaze at a front side. Before the 3D virtual eye is generated, a 3D eye model is generated using a plurality of 3D eyes.

FIGS. 20A through 22 are diagrams illustrating a method of performing texture-warping using a 3D virtual eye according to an embodiment of the present invention.

A 3D eye model refers to a model that is capable of expressing various eyes with a small number of parameters using a 3D eye shape and color information of various different users. One or more 3D eye models may be obtained using data classified based on a race and color in the same manner as a 2D virtual eye.

An eye model obtained using various 3D eye data may be expressed based on the following Equation (16).

$$S = S_0 + \Sigma \alpha_i S_i, T = T_0 + \Sigma \beta_i T_i \qquad \text{Equation (16)}$$

In Equation (16), S denotes a shape of an eye generated as an eye model, $S_0$ denotes an average eye shape, and $\alpha_i S_i$ denotes a product of an eye shape parameter and $i^{th}$ eye shape eigen vector. T denotes a color of an eye generated as an eye model, $T_0$ denotes an average eye color, and $\beta_i T_i$ denotes a product of an eye color parameter and an $i^{th}$ eye color eigen vector. More specifically, each 3D eye shape may be displayed in a space that uses each eye shape eigen vector as an axis, and each 3D eye color is displayed in a space that uses each eye color eigen vector as an axis.

FIG. 20A illustrates a 3D average right eye shape, and FIG. 20B illustrates a 3D average left eye shape according to an embodiment of the present invention.

FIG. 21A illustrates an average right eye color, and FIG. 21B illustrates an average left eye color according to an embodiment of the present invention.

Referring to FIGS. 20A, 20B, 21A, and 21B, in a method of performing texture-warping using a 3D virtual eye according to an embodiment of the present invention, an eye region is extracted from an original user image, and eye shape parameters and eye color parameters of the eye region may be calculated.

The eye shape parameters and the eye color parameters may be calculated based on the following Equation (17).

$$\alpha_i = S_i^T \times (P_S - S_0), \beta_i = T_i^T \times (P_T - T_0) \quad \text{Equation (17)}$$

In Equation (17), $P_S$ and $P_T$ denote an eye shape and an eye color in the original user image, respectively, and $S_i^T$ and $T_i^T$ denote transpose matrices of S and T, respectively.

More specifically, an eye shape of the extracted eye region is displayed in a space that uses each eye shape eigen vector as an axis, and a 3D eye shape of another user that is closest to the eye shape of the user image is detected.

An eye color of the extracted eye region is displayed in a space that uses each eye color eigen vector as an axis, and an eye color of another user that is closest to the eye color of the user image is detected.

A 3D eye may be generated by combining the detected eye shape of the other user and the detected eye color of the other user. In this example, 3D eye shapes and eye colors of other users, which are used for comparison, are stored in a database in advance.

A method of inserting the 3D virtual eye into the original user image (texture-warping) according to an embodiment of the present invention is similar to the corresponding method of inserting the 2D virtual eye into the original user image and therefore, a further detailed description thereof is omitted for clarity and conciseness.

Figure 22:
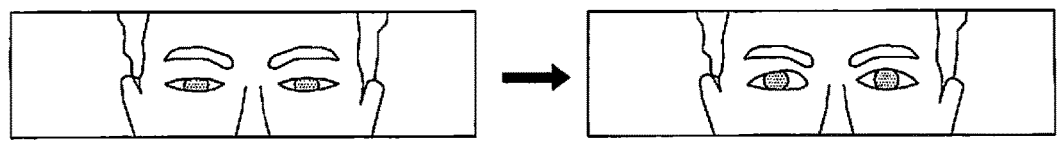

FIG. 22 illustrates gaze-corrected user images to which a 3D virtual eye is inserted according to an embodiment of the present invention.

Referring to FIG. 22, the diagram on the left side indicates an original user image and the diagram on the right side indicates a gaze-corrected user image.

A gaze correction method according to an embodiment of the present invention may be applied to a general image capturing system, a face character generating system, etc., in addition to the described video call system.

According to embodiments of the present invention, an exact outline of an eye is detected from a user image and a shape of an eye that gazes at the front side may be generated by shifting eye outer points based on a previously learned gaze difference. Gaze correction results from methods according to embodiments of the present invention are sharper than conventional operations and reflect a distinct gaze correction effect may be generated using a virtual eye.

The above-described embodiments of the invention may be embodied as hardware, software or a combination of hardware and software. Software may be stored in a volatile or non-volatile storage device such as Read Only Memory (ROM) and other such storage devices regardless of whether the storage devices are erasable or rewritable, a memory such as a Random Access Memory (RAM), a memory chip, a device, and a integrated circuit, or a storage medium that is capable of performing optical or magnetic recording and machine-reading such as a Compact Disc (CD), Digital Versatile Disc (DVD), an optical disc, magnetic tape, etc. A memory may be machine-readable storage media, for example, computer-readable storage media, that is suitable for storing a program including instructions to implement such embodiments, or programs. Therefore, the invention may include a program including a code for implementing a method claimed in a claim of the specification, and a machine-readable storage medium including the program. The program may be transferred electronically through a medium such as a communication signal transferred through a wired or wireless connection, and the invention may appropriately include an equivalent medium.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A non-transitory machine-readable storage medium in which a program for executing a method of correcting a gaze of a user in an image is recorded, the method comprising:
   detecting first eye outer points that define a first eye region of the user in an original image;
   setting second eye outer points different from the first eye outer points; and
   transforming the first eye region inside of the first eye outer points to a second eye region inside of the second eye outer points,
   wherein detecting the first eye outer points includes:
   setting initial eye outer points on the first eye region of the original image based on a shape of an eye model;
   detecting a point having a greatest change in a brightness value in a direction with respect to each initial eye outer point; and
   setting the detected point to be a first eye outer point.

2. The non-transitory machine-readable storage medium of claim 1, wherein detecting the first eye outer points further includes:
   extracting eye model shape parameters of the first eye outer points associated with eigen vectors of the eye model; and
   limiting a range of each of the extracted eye model shape parameters.

3. The non-transitory machine-readable storage medium of claim 1, wherein the second eye outer points correspond to a direction corresponding to a gaze facing straight on to a camera of a device.

4. The non-transitory machine-readable storage medium of claim 1, wherein setting the second eye outer points comprises:
   shifting each first eye outer point to a location obtained by adding a coordinate of each first eye outer point to an average displacement between an eye gazing at a lower side and an eye gazing at a front side.

5. The non-transitory machine-readable storage medium of claim 1, wherein transforming the first eye region comprises:
   mapping pixels inside a first eye outline that sequentially connects the first eye outer points and pixels inside a second eye outline that sequentially connects the second eye outer points.

6. The non-transitory machine-readable storage medium of claim 5, wherein each of the first and second eye outlines is divided into a plurality of triangles formed by connecting corresponding eye outer points, and the mapping is performed on corresponding triangles of the first and the second eye outlines.

7. The non-transitory machine-readable storage medium of claim 1, wherein transforming the first eye region comprises:
mapping pixels inside a first window including a first eye outline that sequentially connects the first eye outer points and pixels inside a second window including a second eye outline that sequentially connects the second eye outer points.

8. The non-transitory machine-readable storage medium of claim 1, wherein transforming the first eye region:
mapping pixels of a predetermined virtual eye and pixels inside a window including an eye outline that sequentially connects the second eye outer points.

9. The non-transitory machine-readable storage medium of claim 8, wherein a brightness of the predetermined virtual eye is adjusted based on a difference between a brightness of the first eye region of the original image and the brightness of the predetermined virtual eye, and the mapping is performed based on the virtual eye of which brightness is adjusted.

10. A mobile terminal for correcting a gaze of a user in an image, the mobile terminal comprising:
a camera for capturing an original image;
a processor for:
detecting first eye outer points that define a first eye region of the user in the original image,
setting second eye outer points different from the first eye outer points, and
transforming the first eye region inside of the first eye outer points to a second eye region inside of the second eye outer points; and
a display unit for displaying a transformed image including the second eye region,
wherein detecting the first eye outer points includes:
setting initial eye outer points on the first eye region of the original image based on a shape of an eye model;
detecting a point having a greatest change in a brightness value in a direction with respect to each initial eye outer point; and
setting the detected point to be a first eye outer point.

11. The mobile terminal of claim 10, wherein detecting the first eye outer points further includes:
extracting eye model shape parameters of the first eye outer points associated with eigen vectors of the eye model; and
limiting a range of each of the extracted eye model shape parameters.

12. The mobile terminal of claim 10, wherein the second eye outer points corresponds to a direction corresponding to a gaze facing straight on to the camera.

13. The mobile terminal of claim 10, wherein setting the second eye outer points includes shifting each first eye outer point to a location obtained by adding a coordinate of each first eye outer point to an average displacement between an eye gazing at a lower side and an eye gazing at a front side.

14. The mobile terminal of claim 10, wherein transforming the first eye region includes mapping pixels inside a first eye outline that sequentially connects the first eye outer points and pixels inside a second eye outline that sequentially connects the second eye outer points.

15. The mobile terminal of claim 14, wherein each of the first and second eye outlines is divided into a plurality of triangles formed by connecting corresponding eye outer points, and the mapping is performed on corresponding triangles of the first and the second eye outlines.

16. The mobile terminal of claim 10, wherein transforming the first eye region includes mapping pixels inside a first window including a first eye outline that sequentially connects the first eye outer points and pixels inside a second window including a second eye outline that sequentially connects the second eye outer points.

17. The mobile terminal of claim 10, wherein transforming the first eye region includes mapping pixels of a predetermined virtual eye and pixels inside a window including an eye outline that sequentially connects the second eye outer points.

18. The mobile terminal of claim 17, wherein a brightness of the predetermined virtual eye is adjusted based on a difference between a brightness of the first eye region of the original image and the brightness of the predetermined virtual eye, and the mapping is performed based on the virtual eye of which brightness is adjusted.

* * * * *